Patented Jan. 20, 1925.

1,523,444

UNITED STATES PATENT OFFICE.

PHILLIP WILLIAM NEVILL AND HERBERT SOANES, OF PERTH, WESTERN AUSTRALIA, AUSTRALIA, ASSIGNORS TO THE AUSTRALIAN MINERALS RECOVERY COMPANY, LIMITED, A COMPANY OF WESTERN AUSTRALIA.

PROCESS FOR THE EXTRACTION OF COPPER FROM ITS ORES.

No Drawing.     Application filed May 27, 1921.  Serial No. 473,020.

*To all whom it may concern:*

Be it known that we, PHILLIP WILLIAM NEVILL and HERBERT SOANES, subjects of the King of Great Britain and Ireland, and both residing at Perth, in the State of Western Australia and Commonwealth of Australia, have invented new and useful Improvements in a Process for the Extraction of Copper from Its Ores, of which the following is a specification.

This invention relates to the recovery of copper from its ores and more particularly to the separation and recovery of the oxidized contents of ores. The invention has for its object the provision of a new and improved method of separating and recovering the oxidized copper contents of ores.

The class of copper ores that may be treated by the process of the invention includes oxidized ores, that is ores in which substantially the whole of the copper is contained for example as oxide, carbonate or silicate or mixtures thereof and includes a roasted product. The process is also applicable to the treatment of a mixed oxide and sulphide ore, that is to say an ore in which the copper contents are partly oxidized and partly sulphidized.

A process has hereto-fore been described in which crushed dry oxidized ores of copper are heated in the presence of a stream of reducing gases with the result that the copper is reduced to the metallic condition in which form it is separated from the gangue by flotation separation.

Another process that has hereto-fore been proposed involves dissolving the oxidized copper contents of an ore in dilute sulphuric acid and then precipitating the whole of the copper as metal by the action of a reducing agent, and finally separating the precipitated copper from the gangue by flotation.

Another prior art process applicable to the treatment of ores containing the mineral cuprite involves treatment with dilute sulphuric acid corresponding to one half of the copper present as cuprite, whereupon one half of such copper is precipitated as the metal whilst the other half goes into solution as the sulphate. The dissolved copper is then precipitated as metal by a reducing agent and the pulp finally treated by flotation for the separation of the metallic copper from the gangue.

The present invention in its broad aspect involves the conversion of the oxidized copper contents of an ore pulp into cement copper as the result of the co-operative action of a reducing agent and an electrolyte insufficient in amount to function as a solvent for the whole of the copper contents. It is to be understood that whilst a relatively large amount of electrolyte may be present and be consumed, yet such consumption is due to certain impurities (such as calcium carbonate) that may be present in particular ores.

We have found that if crushed ore containing some or all of its copper contents in the oxidized condition is formed into a pulp containing an electrolyte and a reducing agent added (e. g. metallic iron) then on heating for a short space of time or on allowing to stand for a lengthy period the oxidized copper contents of the pulp are converted into cement copper.

To enable the invention to be readily understood we will now describe certain practical tests that have been made by us.

Example No. 1. A sample of oxidized copper ore from the Whim Well mine, North Western Australia, containing 6.8% of copper was crushed so that nearly 90% passed through a 150 mesh screen. To 100 parts by weight of such ore was added 500 parts by weight of water and also 2 parts of ferrous sulphate ($FeSO_4.7H_2O$) thereby forming a 0.4% solution of the latter. Iron in the form of fine powder was then added to the extent of 4 parts and steam was blown vigorously through the mass for ten minutes. The result of the above treatment was that substantially the whole of the oxidized copper contents were converted to cement copper leaving a slime and a solution which were both practically free from copper. On subjecting the pulp to elutriation the slime (gangue) readily separated and left a cement copper concentrate which contained metallic copper representing a recovery of 70%.

Example No. 2. To a further portion (100 parts) of similar crushed ore as used in Example No. 1 was added 500 parts of water and also 10 parts of ferrous sulphate (FeSO$_4$7H$_2$) 2 parts of common salt (NaCl) and 3 parts of finely divided iron. Steam was then blown through the mass for 15 minutes. The slime was finally washed off leaving a cement copper concentrate containing metallic copper representing a recovery of 85%.

Example No. 3. A sample of oxidized ore containing alkali earth carbonates from the Wandoo mine, Western Australia, containing 11.9% of copper, was crushed so that about 90% passed through a 150 mesh screen. To 100 parts of such ore was added 300 parts of water, 10 parts of ferrous sulphate (FeSO$_4$7H$_2$O), 2.5 parts of common salt (NaCl), and 11.5 parts of finely divided iron. After passing steam through the mass for 15 minutes the oxidized copper contents were substantially converted into cement copper which it was difficult to separate from the slime by elutriation. On the addition of a little sulphuric acid, however, the cement copper floated and a recovery of 90% of the copper contents of the ore was effected.

Example No. 4. A sample of ore from the Yannery Hill mine, Western Australia, containing 19.7% of copper was crushed so that about 85% passed through a 150 mesh screen. To 100 parts of such ore was added 300 parts of water, 20 parts of ferrous sulphate (FeSO$_4$7H$_2$O), 1 part of common salt (NaCl), and 20 parts of finely divided iron. Through the mixture so formed steam was passed for 15 minutes. The slime was separated by elutriation and a cement copper concentrate remained containing 91% of the copper contents of the ore.

Example No. 5. Another portion of the crushed Yannery Hill ore mentioned in Example No. 4 had 500 parts of water added to 100 parts of ore. Sulphuric acid to yield a 0.5% solution and 15 parts of iron were then added. Steam was passed through the mass for 10 minutes. The slime was separated by elutriation and a concentrate was left containing 88% of the original copper contents.

The solution that remained after the cement copper had been precipitated was separated (before elutriation) and was used for the treatment of another similar sample of crushed ore to which 10 parts of finely divided iron had been added and resulted in the separation and recovery of 90% of the oxidized copper contents of the ore.

The last example illustrates how solutions in which precipitation has been effected may regenerate as mediums in which further precipitations can be carried out. Thus an acid in an initial cycle acting on the precipitating medium or on the ore may form a salt which may be available for subsequent precipitations. A copper sulphate solution may be used to form the pulp and will interact with the iron used for precipitation forming ferrous sulphate which then functions as the salt permitting the conversion to cement copper by the action of the reducing agent on the oxidized ore.

Example No. 6. A sample of Whim Well ore was crushed as in the preceding example and 100 parts thereof mixed with 6 parts of finely divided iron and then formed into a slush with 150 parts of water containing 0.2% of sulphuric acid. The mixture was allowed to stand for three days and on washing off the slime a concentrate was left containing 51% of the orginal copper contents of the ore.

In operating the process the following substances must simultaneously be present:—(a) Ore, (b) water, (c), an electrolyte in the form of an acid or salt or salts, (d) a reducing agent.

The acid or the salt may be added from an outside source or may be contained in the water used or may be present in the ore either naturally or as the result of deliberate artificial generation.

We do not assert that all acids or salts will be efficacious in permitting the reduction or conversion process, in fact it would be impossible for us to test and enumerate all substances of this character. Satisfactory results have been obtained by us by the use of sulphuric acid, hydro-chloric acid, ferrous sulphate or chloride, ferric sulphate or chloride (with increased iron consumption) copper sulphate, a mixture of ferrous sulphate or copper sulphate with sodium or magnesium chloride, a mixture of aluminium sulphate and chloride, zinc sulphate containing free acid. We have also obtained qualitative results with tannic acid, oxalic acid, sea water.

In many localities the most satisfactory acid or salts to enable the conversion to be effected will be either dilute sulphuric acid, ferrous chloride, or a mixture of ferrous sulphate and a soluble chloride.

Whilst we are not able to enumerate all the acids, salts or mixtures that may be used the following test can be employed to supply this information as far as any particular substance or mixture is concerned. Take 10 grams of the finely crushed oxidized copper ore (minus 150 mesh screen) add 50 cubic centimeters of water, 1 gram of the substance (acid or salt) being tested and finely powdered metallic iron equivalent to the oxidized copper present. Heat the mixture in a beaker for 10 minutes and then carefully wash off the slime which will leave a residue containing some cement copper if the substance being tested is efficacious in assisting the reduction or conversion when used in the proportion specified. If cement copper is not produced the result of the test can be verified or modified by two further tests, one using only 0.2 grams of the substance and the other using 10 grams thereof.

If the result of the test is affirmative it can readily be determined whether it permits a high percentage separation by weighing and assaying the residue remaining after the separation of the slime.

There are a number of factors, variation of some of which will obviously lead to enhanced commercial results when the process is applied to a particular ore. These factors include:—

(1) Degree of crushing.
(2) Thickness of pulp.
(3) Proportion of acid or salt present.
(4) Time of reduction.
(5) Amount of reducing agent used.
(6) Reducing agent employed and its physical condition.

The operator will vary these factors until he obtains conditions which applied to his ore are most attractive commercially.

As to the reducing agent employed, metallic iron either in coarse pieces or as fine powder has advantages on account of its low cost. Tests made by us indicate that satisfactory extractions are obtained using metallic zinc or aluminium.

It is notorious that ores differ most markedly in their composition and consequent behaviour towards reagents. This statement is exemplified by reference to Example No. 3, which describes a test on ore from the Wandoo mine with which it was not possible to obtain even a satisfactory qualitative reduction in the presence of ferrous sulphate alone in the pulp, whereas when 0.8% of common salt was added a 90% extraction was obtained. There are doubtless other ores in treating which similar difficulties will be encountered. The solution of local difficulties of this character is the ordinary vocation of persons skilled in the art who are called upon to initiate the operation of any new process to any particular ore body.

It has been previously indicated that our invention primarily resides in the means whereby copper is separated in the pulp by the conversion of the oxidized copper contents. The method which can most conveniently be employed for the subsequent separation of the cement copper from the gangue will depend on the composition of the ore being treated and also on its physical condition. If the ore contains mixed sulphides and oxides of copper, flotation will yield a concentrate containing the copper values as a mixture of undecomposed sulphide and cement copper. If the ore contains its copper contents substantially oxidized then when an all slime product is treated elutriation will leave a rich cement copper residue. If the ore is crushed fairly coarse then a low grade cement copper (containing sand) will remain, in which case flotation separation can be utilized either directly on the decomposed pulp or on the low grade cement copper and sand residue.

In the appended claims the words "electrolyte insufficient in amount" mean the aforesaid proportions over and above the amount of electrolyte consumed by impurities that may be present in a particular ore being treated.

We claim:—

1. The method of recovering the oxidized copper contents of ores containing the same, which comprises treating the ore in the form of a pulp with metallic iron and an electrolyte in amount insufficient to function as a solvent for the whole of the copper contents, thereby converting the oxidized copper contents of the ore into metallic copper, and separating the resulting metallic copper from the remainder of the pulp.

2. The method of recovering the oxidized copper contents of ores containing the same, which comprises treating the ore in the form of a pulp with metallic iron and ferrous sulphate in amount insufficient to dissolve the whole of the copper contents, thereby converting the oxidized copper contents of the ore into metallic copper, and separating the resulting metallic copper from the remainder of the pulp.

3. The method of recovering the oxidized copper contents of ores containing the same, which comprises subjecting the ore in the form of a pulp to the co-operative action of metallic iron and a soluble chloride and a sulphate radical insufficient in amount to function as a solvent for the whole of the copper contents, thereby converting the oxidized copper contents of the ore into metallic copper, and separating the resulting metallic copper from the remainder of the pulp.

4. The method of recovering the oxidized copper contents of ores containing the same, which comprises subjecting the ore in the form of a pulp to the co-operative action of metallic iron and a soluble chloride and ferrous sulphate insufficient in amount to function as a solvent for the whole of the copper contents, thereby converting the oxidized copper contents of the ore into metallic copper, and separating the resulting metallic copper from the remainder of the pulp.

5. The method of recovering the oxidized copper contents of ores containing the same, which comprises treating the ore in the form of a pulp with metallic iron and an electrolyte in amount insufficient to function as a solvent for the whole of the copper contents, the action being accelerated by increasing the temperature, thereby converting the oxidized copper contents of the ore into metallic copper, and separating the resulting metallic copper from the remainder of the pulp.

Dated this seventh day of April, 1921.

PHILLIP WILLIAM NEVILL.
HERBERT SOANES.